(12) United States Patent
Sane et al.

(10) Patent No.: US 9,203,459 B2
(45) Date of Patent: Dec. 1, 2015

(54) HARMONIC DATA TRANSFER IN ROTARY WING AIRCRAFT

(71) Applicant: Sikorsky Aircraft Corporation, Stratford, CT (US)

(72) Inventors: Harshad S. Sane, Southbury, CT (US); Claude G. Matalanis, Longmeadow, MA (US); Derek Geiger, Wilton, CT (US); Donald W. Fowler, Oxford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 267 days.

(21) Appl. No.: 13/865,323

(22) Filed: Apr. 18, 2013

(65) Prior Publication Data

US 2014/0314130 A1    Oct. 23, 2014

(51) Int. Cl.
| | | |
|---|---|---|
| *H04B 1/02* | (2006.01) |
| *H04B 1/06* | (2006.01) |
| *H04B 1/3822* | (2015.01) |
| *B64C 27/00* | (2006.01) |
| *B64C 27/32* | (2006.01) |
| *B64C 27/72* | (2006.01) |

(52) U.S. Cl.
CPC ............ *H04B 1/3822* (2013.01); *B64C 27/001* (2013.01); *B64C 27/32* (2013.01); *B64C 27/72* (2013.01); *Y02T 50/34* (2013.01)

(58) Field of Classification Search
CPC .............................. B64C 27/00; B64C 27/001
USPC ............ 244/17.11, 17.13; 375/219, 316, 260
See application file for complete search history.

(56) References Cited

U.S. PATENT DOCUMENTS

| | | | |
|---|---|---|---|
| 4,894,787 A | 1/1990 | Flannelly et al. | |
| 5,316,240 A | 5/1994 | Girard et al. | |
| 6,453,273 B1 | 9/2002 | Qian et al. | |
| 8,201,771 B2 | 6/2012 | Kessler et al. | |
| 2006/0027703 A1* | 2/2006 | Bussom et al. | ............ 244/17.13 |
| 2009/0254292 A1 | 10/2009 | Wegener | |
| 2012/0250740 A1* | 10/2012 | Ling | ............... 375/219 |
| 2013/0304400 A1* | 11/2013 | Isom et al. | ........................ 702/41 |
| 2014/0145025 A1* | 5/2014 | Fang et al. | ................. 244/17.11 |

* cited by examiner

*Primary Examiner* — Kevin Kim
(74) *Attorney, Agent, or Firm* — Cantor Colburn LLP

(57) ABSTRACT

A rotary wing aircraft includes a rotor assembly includes a rotor sensor generating a rotor sensor time domain signal; a rotor transform module converting the rotor sensor time domain signal to a rotor sensor frequency domain signal; and a rotor transceiver for transmitting the rotor sensor frequency domain signal over a transfer medium; an airframe assembly including: an airframe transceiver receiving the rotor sensor frequency domain signal; and an airframe transform module converting the rotor sensor frequency domain signal to the rotor sensor time domain signal. Signals from the airframe assembly may also be converted to the frequency domain prior to transfer over the transfer medium to the rotor assembly.

18 Claims, 3 Drawing Sheets

HARMONIC DATA TRANSFER IN ROTARY WING AIRCRAFT

BACKGROUND

The subject matter disclosed herein relates generally to rotary wing aircraft, and in particular to harmonic data transfer in a rotary wing aircraft.

In a rotary wing aircraft, signals are often transferred between a stationary component (e.g., the airframe) and a rotating component (e.g., rotor system). For example, rotary wing aircraft having active rotors transfer rotor sensor signals from sensors on the rotor blades to a control system in the airframe. Control signals from an airframe control system are also transferred from the airframe to the rotor system. Transferring a time domain signal between the airframe system and rotor system requires significant bandwidth. Delays in signal transfer can impede certain control techniques due to a lack of consistent and timely data transfer between system components. Signal dimension and capacity limitations in transfer media results can preclude certain control techniques, altogether.

SUMMARY

One embodiment includes a rotary wing aircraft includes a rotor assembly includes a rotor sensor generating a rotor sensor time domain signal; a rotor transform module converting the rotor sensor time domain signal to a rotor sensor frequency domain signal; and a rotor transceiver for transmitting the rotor sensor frequency domain signal over a transfer medium; an airframe assembly including: an airframe transceiver receiving the rotor sensor frequency domain signal; and an airframe transform module converting the rotor sensor frequency domain signal to the rotor sensor time domain signal.

Another embodiment includes a method for transferring signals in a rotary wing aircraft, the method including in a rotor system, generating a rotor sensor time domain signal; converting the rotor sensor time domain signal to a rotor sensor frequency domain signal; and transmitting the rotor sensor frequency domain signal over a transfer medium; in an airframe system, receiving the rotor sensor frequency domain signal; and converting the rotor sensor frequency domain signal to the rotor sensor time domain signal.

Another embodiment includes a rotary wing aircraft including an airframe assembly including: an airframe controller generating an airframe time domain signal; an airframe transform module converting the airframe time domain signal to an airframe frequency domain signal; and an airframe transceiver for transmitting the airframe frequency domain signal over a transfer medium; a rotor assembly including: a rotor transceiver receiving the airframe frequency domain signal; and a rotor transform module converting the airframe frequency domain signal to the airframe time domain signal.

Other aspects, features, and techniques of the invention will become more apparent from the following description taken in conjunction with the drawings.

BRIEF DESCRIPTION OF THE DRAWINGS

Referring now to the drawings wherein like elements are numbered alike in the several FIGURES, in which.

DETAILED DESCRIPTION

Figure 1:
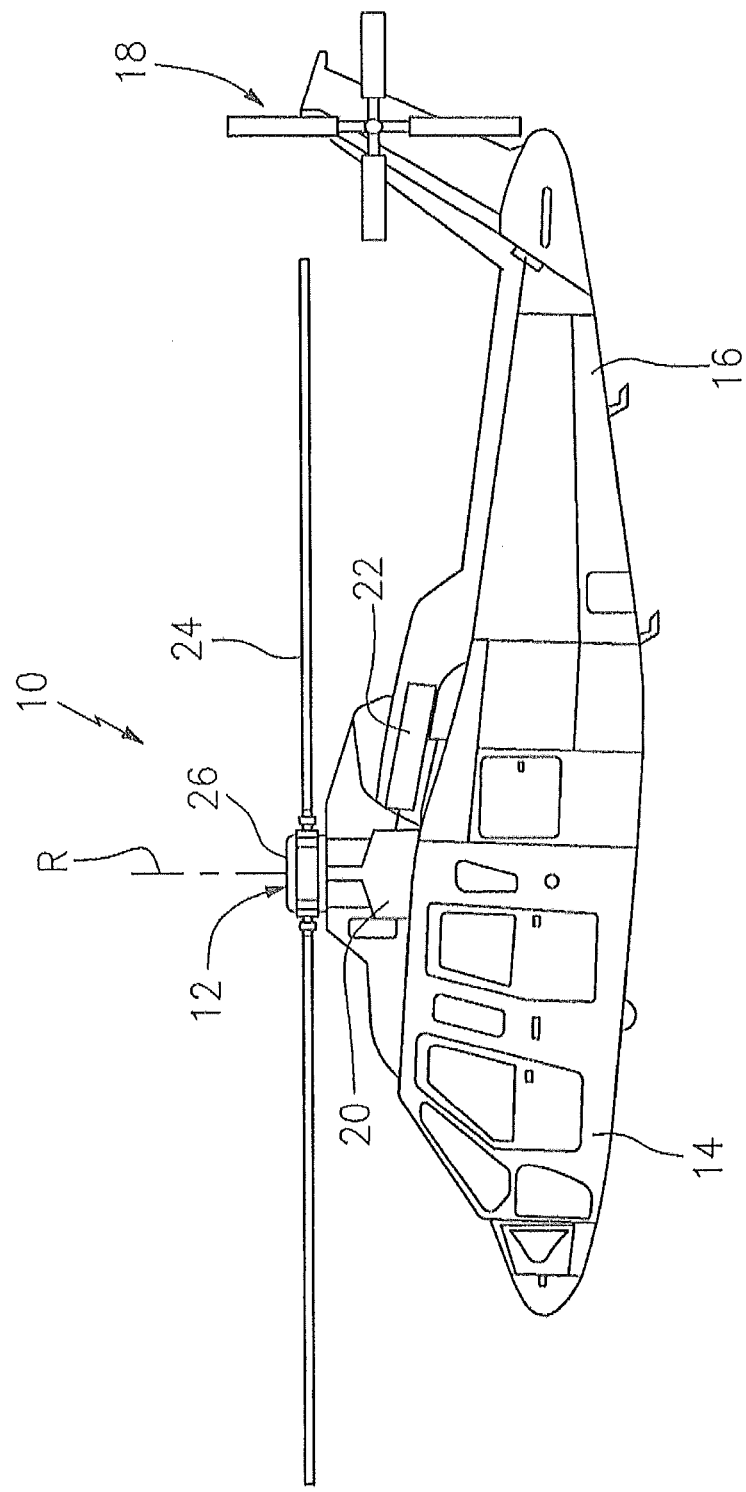
FIG. 1 depicts a rotary wing aircraft in an exemplary embodiment.

FIG. 1 illustrates a rotary wing aircraft 10 having a main rotor system 12 in an exemplary embodiment. The aircraft 10 includes an airframe 14 having an extending tail 16 which mounts a tail rotor system 18, such as an anti-torque system, a translational thrust system, a pusher propeller, a rotor propulsion system, and the like. The main rotor system 12 is driven about an axis of rotation R through a main gearbox (illustrated schematically at 20) by one or more engines 22. The main rotor system 12 includes a plurality of rotor blades 24 mounted to a rotor hub 26. Although a particular rotary wing aircraft configuration is illustrated, other configurations and/or machines, such as high speed compound rotary wing aircraft with supplemental translational thrust systems, swashplateless rotor configurations, dual contra-rotating aircraft, coaxial rotor system aircraft, turbo-props, tilt-rotors and tilt-wing aircraft, will also benefit from embodiments of the invention.

Figure 2:
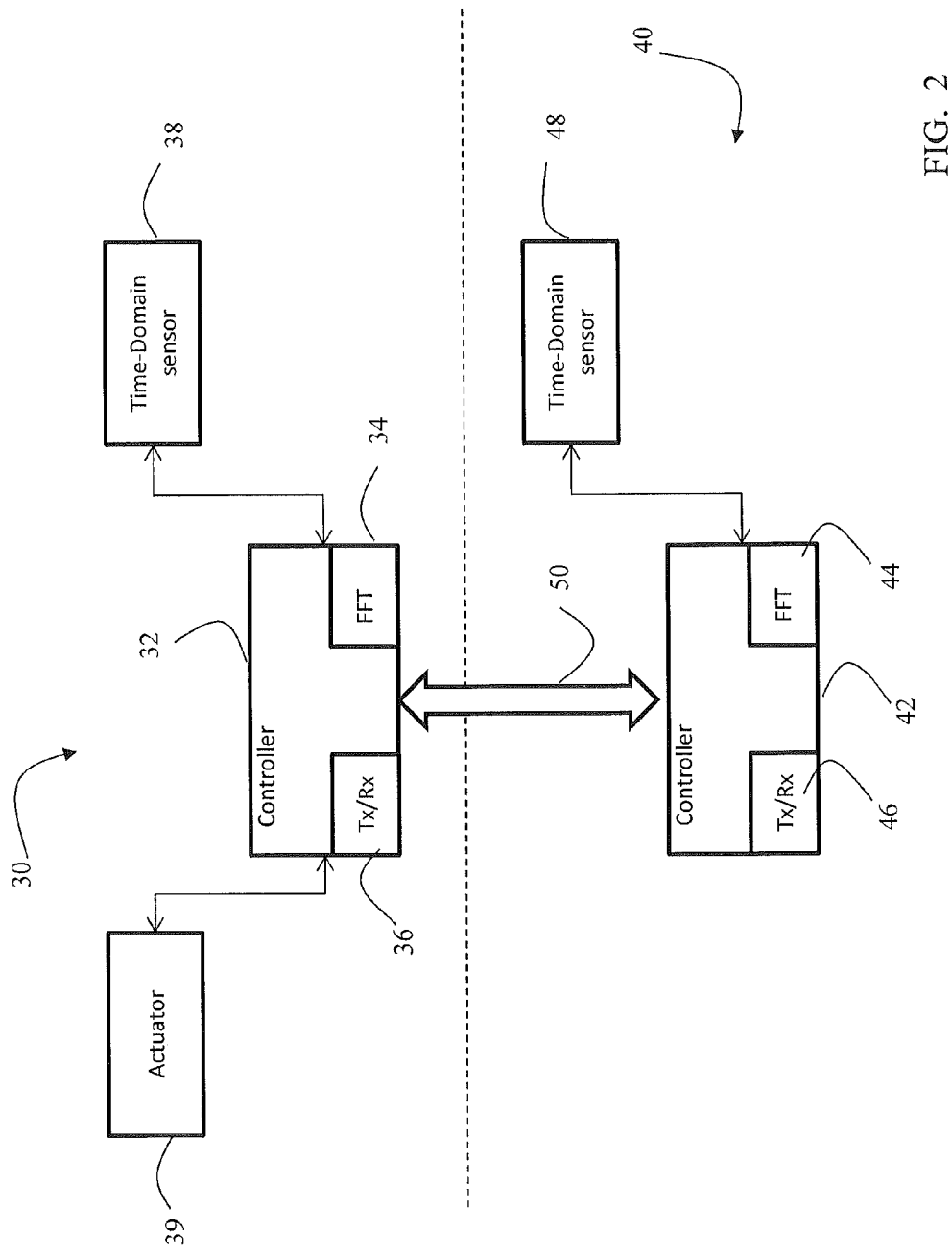
FIG. 2 depicts a block diagram of a system for transferring data between a rotor assembly and airframe assembly in an exemplary embodiment.

FIG. 2 is a block diagram of a system for transferring data between a rotor assembly 30 and airframe assembly 40 in an exemplary embodiment. Airframe assembly 40 is located in the airframe 14 and includes an airframe controller 42. Airframe controller 42 may be implemented using a general-purpose microprocessor executing a computer program stored on a storage medium to perform the operations described herein. Alternatively, airframe controller 42 may be implemented in hardware (e.g., ASIC, FPGA) or in a combination of hardware/software. Airframe controller 42 may also be part of a flight control system that is part of the rotary wing aircraft 10.

Airframe controller 42 includes an airframe transform module 44 that converts signals from one domain to another domain, and vice versa. In exemplary embodiments, the airframe transform module 44 is a fast Fourier transform (FFT) module to convert signals from the time domain to the frequency domain. Airframe transform module 44 also performs an inverse transform, from the frequency domain to the time domain. An airframe transceiver module 46 is used to send and receive signals over a transfer medium 50 that communicates signals between the airframe assembly 40 and rotor assembly 30.

Airframe sensors 48 detect conditions of the airframe 14 and provide airframe sensor signals to airframe controller 42. Airframe sensors 48 may detect a variety of conditions, such as position of airframe elements, speed, acceleration, etc. Airframe sensors 48 produce airframe sensor signals in a first domain, for example, the time domain.

Rotor assembly 30 is located in the rotor system 12. Portions of the rotor assembly may be mounted in the rotor hub 26 and other portions in rotor blades 24. A rotor controller 32 is positioned, for example, in rotor hub 26. Rotor controller 32 may be implemented using a general-purpose microprocessor executing a computer program stored on a storage medium to perform the operations described herein. Alternatively, rotor controller 32 may be implemented in hardware (e.g., ASIC, FPGA) or in a combination of hardware/software.

Rotor controller 32 includes a rotor transform module 34 that converts signals from one domain to another domain, and vice versa. In exemplary embodiments, the rotor transform module 34 is a fast Fourier transform (FFT) module to convert signals from the time domain to the frequency domain. Rotor transform module 34 also performs an inverse transform, from the frequency domain to the time domain. A rotor transceiver module 36 is used to send and receive signals over a transfer medium 50 that communicates signals between the airframe assembly 40 and rotor assembly 30.

Rotor sensors 38 detect conditions of the rotor system 12 and provide rotor sensor signals to rotor controller 32. Rotor sensors 38 may detect a variety of conditions, such as position of rotor elements, speed, acceleration, etc. Rotor sensors 38 produce rotor sensor signals in a first domain, for example, the time domain. Rotor sensor signals from rotor sensors 38 are provided to rotor controller 32. Rotor controller 32 may generate control signals for rotor actuators 39 in response to the rotor sensor signals. Rotor controller 32 may also transmit the rotor sensor signals to airframe controller 42 as described in further detail herein.

Rotor actuators 39 may interface with a variety of components on the rotor system 12. For example, rotor actuators 39 may be included in rotor hub 26 to control individual blade pitch, lead-lag, flap, etc. Rotor actuators 39 may also be positioned in rotor blades 24 to control flight characteristics of the rotor blades 24. For example, rotor blades 24 may be active rotor blades having control surfaces positioned by rotor actuators 39. Rotor actuators 39 may be electrically controlled actuators that impart physical movement to components of the rotor system 12 in response to control signals from rotor controller 32.

Transfer medium 50 may be a wired link, such as a slip ring. Alternatively, transfer medium may be a wireless link, such as a UHF, WIFI broadband, rotary transformer, optical communication, etc. In this embodiment, airframe transceiver 46 and rotor transceiver 36 use wireless communications protocols (e.g., 802.11x, Bluetooth, NFC) to send signals wirelessly, if using UHF or WIFI broadband, and other appropriate digital protocols for the other types of transfer medium 50.

Figure 3:
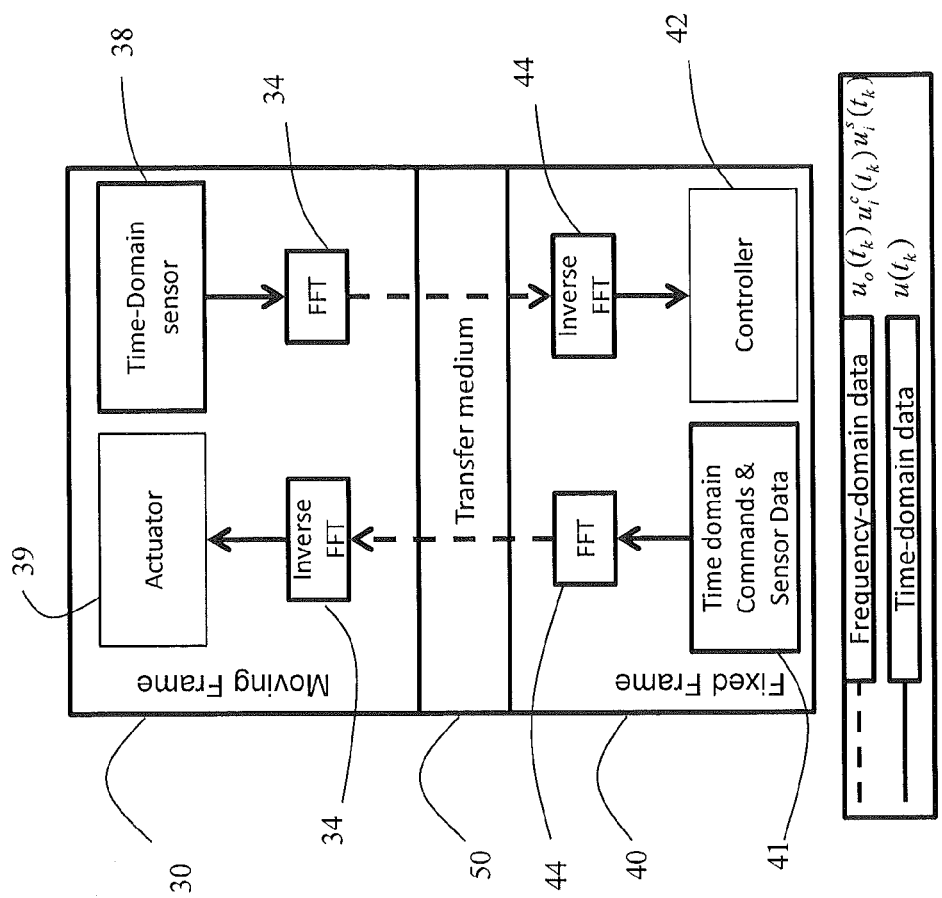
FIG. 3 depicts transmission and transformation of signals between airframe assembly and rotor assembly in an exemplary embodiment.

FIG. 3 depicts transmission and transformation of signals between airframe assembly 40 and rotor assembly 30. FIG. 3 depicts a scenario where a rotor sensor time domain signal is generated at rotor sensor 38 and then transformed to a rotor sensor frequency domain signal by rotor transform module 34. Rotor transceiver 36 transmits the rotor sensor frequency domain signal to airframe transceiver 46 over the transfer medium 50. Airframe transform module 44 performs an inverse frequency transform to provide the rotor sensor time domain signal to airframe controller 42. It is understood that the output of the airframe transform module 44 may not exactly match the original rotor sensor time domain signal, due to errors (e.g., roundoff) in the particular transform/inverse transform used. References to the rotor sensor time domain signal after transform/inverse transform includes such errors, along with errorless versions.

Airframe controller 42 generates an airframe time domain control signal (e.g., adjust blade pitch) in response to the various sensor signals. An airframe sensor time domain signal from airframe sensor 48 may also be obtained by airframe controller 42. The airframe time domain signals 41 (e.g., control signals and/or sensor signals) are transformed to airframe frequency domain signals by airframe transform module 44. The airframe frequency domain signals are transmitted across transmission medium 50 by airframe transceiver 46.

The rotor transceiver 36 receives the airframe frequency domain signals. The rotor transform module 34 converts the airframe frequency domain signals to airframe time domain signals by applying the inverse transform. It is understood that the output of the rotor transform module 34 may not exactly match the original airframe time domain signal, due to errors (e.g., roundoff) in the particular transform-inverse transform used. References to the airframe time domain signal after transform/inverse transform includes such errors, along with errorless versions.

Rotor controller 32 processes the various airframe and rotor time domain signals to generate control signals for actuator 39. It is understood that the types of signals generated and processed (e.g., sensor signal, control signals) are exemplary, and that other signal types may be processed.

FIG. 3 also depicts the nature of the frequency domain signals. For a time domain signal of value $u(t_k)$ at any given time $t_k$, the transform modules 34 and 44 creates $u_o(t_k)$, representing the mean (also known as average or zero-th component) of the time domain signal and a pair of harmonic coefficients, $u_i^c(t_k)$ representing the amplitude of the cosine component at frequency $\omega_i$, of the time domain signal, $u_i^s(t_k)$, representing the amplitude of the sine component at frequency $\omega_i$ of the time domain signal. In another embodiment of the frequency domain signal, the transform modules 34 and 44 creates $u_o(t_k)$, representing the mean (also known as average or zero-th component) of the time domain signal and a pair of harmonic coefficients, $u_i^s(t_k)$ representing the amplitude of the sine component at frequency $\omega_i$ of the time domain signal, and $\phi_i(t_k)$, representing the phase of the sine component at frequency $\omega_i$ of the time domain signal. The frequency domain signal is represented by choosing a finite number n of $\omega_i$, namely $\omega_1$ to $\omega_n$ to adequately represent the time domain signal. Transforming the time domain signal prior to transmission over the transfer medium 50 reduces the amount of data for transmission.

Further, the transform modules 34 and 44 may limit the transformation from the time domain to the frequency domain for a set of frequencies $\omega_i$ deemed relevant to the system. For example, in a rotary wing aircraft, the pair of coefficients (cosine component, and sine component) may be generated for a fundamental frequency (e.g., $\omega_1$=the rotor RPM) and multiples of the fundamental frequency (harmonics, e.g. $\omega_n$=n*$\omega_1$). The mean or the average is also referred to as the $0^{th}$ harmonic. As used herein, a frequency domain signal includes the average or $0^{th}$ harmonic, and amplitudes of cosine and sine components in fundamental frequency ($1^{st}$ harmonic) and multiples of the fundamental frequency.

The rotor transform module 34 may compute harmonics of a fundamental frequency (e.g., rotor fundamental frequency), and only generate coefficients for the harmonic components of the time domain signal. Limiting the coefficients to harmonic components of the time domain signal further reduces the amount of data. This also eliminates coefficients attributable to non-harmonic signals, which are often less relevant to measurement or control of the rotor system. Transferring coefficients of harmonic components of the time domain signal also allows the transceivers 34 and 44 to operate at a lower data rate, as the coefficients only need to capture variation in the harmonic coefficients and not the time domain signal itself.

Embodiments provide for a reduction in data transferred between and airframe system and rotor system of a rotary wing aircraft. Reducing the amount of data allows the data to be repeated multiple times, which improves redundancy and fault-detection. The system may employ low cost, low power, low weight components and commercial off-the-shelf electronic components for on-rotor harmonic computation.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A rotary wing aircraft comprising:
    a rotor assembly including:
        a rotor sensor generating a rotor sensor time domain signal;
        a rotor transform module converting the rotor sensor time domain signal to a rotor sensor frequency domain signal; and
        a rotor transceiver for transmitting the rotor sensor frequency domain signal over a transfer medium;
    an airframe assembly including:
        an airframe transceiver receiving the rotor sensor frequency domain signal; and
        an airframe transform module converting the rotor sensor frequency domain signal to the rotor sensor time domain signal.

2. The rotary wing aircraft of claim 1 wherein:
    the rotor transform module converts the rotor sensor time domain signal to the rotor sensor frequency domain signal by generating coefficients representing a component of the rotor sensor time domain signal.

3. The rotary wing aircraft of claim 2 wherein:
    the coefficients include an amplitude of a cosine component of the rotor sensor time domain signal for each frequency chosen in frequency domain signal, an amplitude of a sine component of the rotor sensor time domain signal for each frequency chosen in frequency domain signal, and a mean value of the rotor sensor time domain signal.

4. The rotary wing aircraft of claim 2 wherein:
    the coefficients include an amplitude of a sine component of the rotor sensor time domain signal for each frequency chosen in frequency domain signal, a phase of the sine component of the rotor sensor time domain signal for each frequency chosen in frequency domain signal, and a mean value of the rotor sensor time domain signal.

5. The rotary wing aircraft of claim 4 wherein:
    the rotor transform module converts the rotor sensor time domain signal to the rotor sensor frequency domain signal by generating coefficients representing harmonic components of the rotor sensor time domain signal.

6. The rotary wing aircraft of claim 5 wherein:
    the coefficients include an amplitude of a cosine component of the harmonic components of the rotor sensor time domain signal for each frequency chosen in frequency domain signal, an amplitude of a sine component of the harmonic components of the rotor sensor time domain signal for each frequency chosen in frequency domain signal, and a mean value of the rotor sensor time domain signal.

7. The rotary wing aircraft of claim 5 wherein:
    the coefficients include an amplitude of a sine component of the harmonic components of the rotor sensor time domain signal for each frequency chosen in frequency domain signal, a phase of the sine component of the harmonic components of the rotor sensor time domain signal for each frequency chosen in frequency domain signal, and a mean value of the rotor sensor time domain signal.

8. The rotary wing aircraft of claim 1 wherein:
    the transfer medium is a wired link.

9. The rotary wing aircraft of claim 1 wherein:
    the transfer medium is a wireless link.

10. A method for transferring signals in a rotary wing aircraft, the method comprising:
    in a rotor system, generating a rotor sensor time domain signal;
    converting the rotor sensor time domain signal to a rotor sensor frequency domain signal; and
    transmitting the rotor sensor frequency domain signal over a transfer medium;
    in an airframe system, receiving the rotor sensor frequency domain signal; and
    converting the rotor sensor frequency domain signal to the rotor sensor time domain signal.

11. The method of claim 10 wherein:
    converting the rotor sensor time domain signal to the rotor sensor frequency domain signal includes generating coefficients representing a component of the rotor sensor time domain signal.

12. The method of claim 11 wherein:
    the coefficients include an amplitude of a cosine component of the rotor sensor time domain signal for each frequency chosen in frequency domain signal, an amplitude of a sine component of the rotor sensor time domain signal for each frequency chosen in frequency domain signal, and a mean-value of the rotor sensor time domain signal.

13. The method of claim 10 wherein:
    the coefficients include an amplitude of a sine component of the rotor sensor time domain signal for each frequency chosen in frequency domain signal, a phase of the sine component of the rotor sensor time domain signal for each frequency chosen in frequency domain signal, and a mean value of the rotor sensor time domain signal.

14. The method of claim 13 wherein:
    converting the rotor sensor time domain signal to the rotor sensor frequency domain signal includes generating coefficients representing a harmonic components of the rotor sensor time domain signal.

15. The method of claim 14 wherein:
    the coefficients include an amplitude of a cosine component of the harmonic components of the rotor sensor time domain signal for each frequency chosen in frequency domain signal, an amplitude of a sine component of the harmonic components of the rotor sensor time domain signal for each frequency chosen in frequency domain signal, and a mean value of the rotor sensor time domain signal.

16. The method of claim 14 wherein:
    the coefficients include an amplitude of a sine component of the harmonic components of the rotor sensor time domain signal for each frequency chosen in frequency domain signal, a phase of the sine component of the harmonic components of the rotor sensor time domain signal for each frequency chosen in frequency domain signal, and a mean value of the rotor sensor time domain signal.

17. The method of claim 10 wherein:
the transfer medium is a wired link.
18. The method of claim 10 wherein:
the transfer medium is a wireless link.

* * * * *